(12) United States Patent
Yu

(10) Patent No.: US 7,434,429 B1
(45) Date of Patent: Oct. 14, 2008

(54) AUTOMOBILE STEERING WHEEL LOCK

(75) Inventor: Pin-Ying Yu, Tainan (TW)

(73) Assignee: Yung Chan Electrical Instrument Co., Ltd., Tainan (TW)

( * ) Notice: Subject to any disclaimer, the term of this patent is extended or adjusted under 35 U.S.C. 154(b) by 0 days.

(21) Appl. No.: 12/018,215

(22) Filed: Jan. 23, 2008

(51) Int. Cl.
*B60R 25/02* (2006.01)

(52) U.S. Cl. .................................................. 70/209

(58) Field of Classification Search ............ 70/19, 70/209, 211, 212, 225, 226, 237, 238
See application file for complete search history.

(56) References Cited

U.S. PATENT DOCUMENTS

| | | | | | |
|---|---|---|---|---|---|
| 1,920,521 | A | * | 8/1933 | Patterson | 70/19 |
| 4,104,895 | A | * | 8/1978 | Tankel | 70/237 |
| 5,157,951 | A | * | 10/1992 | Chen et al. | 70/209 |
| 5,197,309 | A | * | 3/1993 | Del Rosario | 70/209 |
| 5,454,242 | A | * | 10/1995 | Su | 70/209 |
| 5,676,000 | A | * | 10/1997 | Chen | 70/209 |
| 5,718,133 | A | * | 2/1998 | Chen et al. | 70/209 |
| 5,921,120 | A | * | 7/1999 | Wu | 70/209 |
| 6,357,269 | B1 | * | 3/2002 | Wu | 70/209 |
| 6,360,568 | B1 | * | 3/2002 | Chen | 70/209 |
| 6,615,956 | B1 | * | 9/2003 | Chuang | 188/24.18 |
| 7,043,947 | B1 | * | 5/2006 | Yu | 70/209 |
| 7,301,443 | B2 | * | 11/2007 | Yu | 340/426.31 |

* cited by examiner

*Primary Examiner*—Lloyd A Gall

(57) ABSTRACT

An automobile steering wheel lock includes a base having one side provided with a lock core holder bored therein with a recessed chamber, and an underside disposed with an accommodating chamber formed therein with a recess. The recessed chamber is bored with a lock pin hole and an insert hole both passing through the accommodating chamber. An elastic plate and a position-limiting rod are assembled in the accommodating chamber. The position-limiting rod is provided with an insert hole, a lock pin hole, a blocking plate fixed at a lower end and a pivot capable of being inserted in the insert holes of the lock core holder and of the position-limiting rod. A lock core is received in the recessed chamber and provided with a lock pin. The automobile steering wheel lock is convenient in operation, hard to be destroyed and having excellent effect of anti-burglary.

3 Claims, 5 Drawing Sheets

AUTOMOBILE STEERING WHEEL LOCK

BACKGROUND OF THE INVENTION

1. Field of the Invention

This invention relates to an automobile steering wheel lock, particularly to one able to be quickly and conveniently locked on an automobile steering wheel, hard to be damaged and effectively preventing the automobile from being burgled.

2. Description of the Prior Art

Referring to FIG. 1, a conventional automobile steering wheel lock 1 includes a lock base 10 provided thereon with a lock core 11 and having one end fixed with a stationary rod 12 having a hook 13 secured at its underside. The lock base 10 has the other end bored with an insert slot 14 for a telescopic rod 15 to be inserted therein. The telescopic rod 15 has one end disposed with a clasping member 16 and its surface provided with several continual engage grooves 17. In using, the steering wheel lock 1 is first flatly positioned on the automobile steering wheel and has the hook 13 at the underside of the stationary rod 12 hooked on the inner side of one side of the steering wheel. Subsequently, the telescopic rod 15 is drawn outward to have the clasping member 16 clasped on the inner side of another side of the steering wheel. By so designing, when the stationary rod 12 is extended and firmly positioned between the steering wheel and a driver's seat, the rotating angles of the steering wheel can be restricted and thus the automobile can be prevented from being burgled.

However, the conventional steering wheel lock 1 is liable to be destroyed by a burglar and fails to produce locking effect in case the burglar employs tools to reversely knock the telescopic rod 15 or the lock base 10 with a great force to break the engage pin in the lock core 11.

SUMMARY OF THE INVENTION

The objective of this invention is to offer an automobile steering wheel lock able to be quickly and conveniently locked on an automobile steering wheel, not easy to be destroyed and having excellent effect in anti-burglary for automobiles.

The automobile steering wheel lock in the present invention includes a base, an elastic plate, a position-limiting rod and a lock core. The base has a front end provided with a clasping member, a rear end provided with a stationary rod, one side provided with a lock core holder formed therein with a recessed chamber, and an underside provided with an accommodating chamber formed therein with a recess. The recessed chamber is bored with a lock pin hole and an insert hole both passing through the accommodating chamber. The elastic plate and the position-limiting rod are respectively assembled in the accommodating chamber of the base. The position-limiting rod is provided with an insert hole, a lock pin hole, a blocking plate fixed at a lower end, and a pivot capable of being inserted in the insert holes of the lock core holder and of the position-limiting rod. The lock core received in the recessed chamber of the lock core holder is provided with a lock pin fixed thereon.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
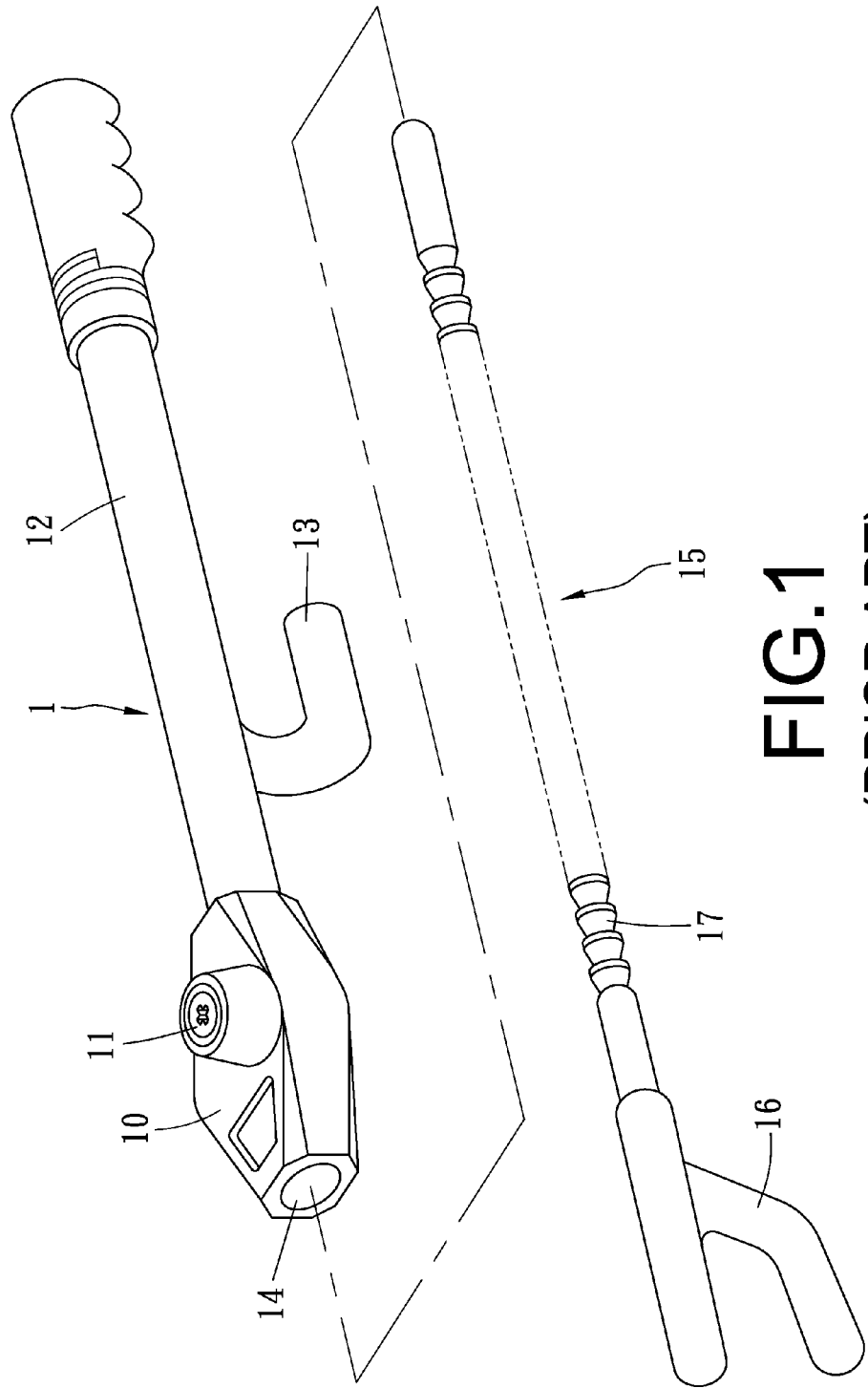
FIG. 1 is an exploded perspective view of a conventional automobile steering wheel lock.
Figure 2:
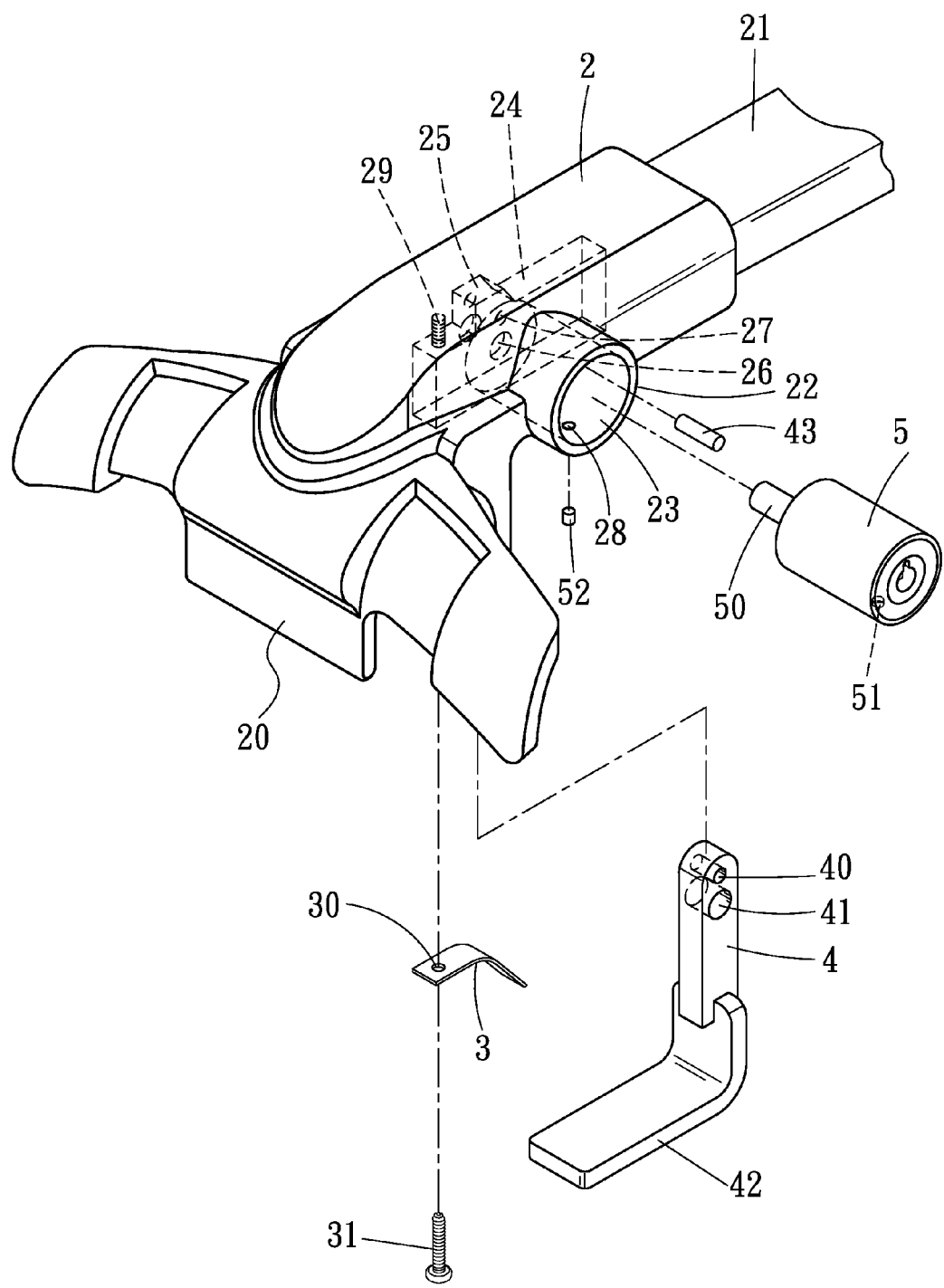
FIG. 2 is an exploded perspective view of an automobile steering wheel lock in the present invention.

A preferred embodiment of an automobile steering wheel lock in the present invention, as shown in FIG. 2, includes a base 2, an elastic plate 3, a position-limiting rod 4 and a lock core 5 as main components combined together.

The base 2 has a front end provided with a clasping member 20, a rear end provided with a stationary rod 21, and one side provided with a lock core holder 22 formed therein with a recessed chamber 23. The base 2 further has an underside provided with an accommodating chamber 24 formed therein with a recess 25 and a threaded hole 29. The recessed chamber 23 of the lock core holder 22 is bored with a lock pin hole 26 and an insert hole 27 both passing through the accommodating chamber 24. The lock core holder 22 has its wall bored with a pin hole 28 communicating with the recessed chamber 23.

The elastic plate 3 assembled in the accommodating chamber 24 of the base 2 is bored with an insert hole 30 for a locking member 31 to be inserted therethrough and screwed in the threaded hole 29 of the base 2.

The position-limiting rod 4 assembled in the accommodating chamber 24 of the base 2 is provided with an insert hole 40, a lock pin hole 41 a blocking plate 42 fixed at a lower end, and a pivot 43 capable of being inserted in both the insert holes 27, 40 of the lock core holder 22 and of the position-limiting rod 4.

The lock core 5 received in the recessed chamber 23 of the lock core holder 22 is provided with a lock pin 50, a pin hole 51 in its outer wall, and a fixing pin 52 capable of being inserted in both the pin holes 28, 51 of the lock core holder 22 and of the lock core 5.

Figure 3:
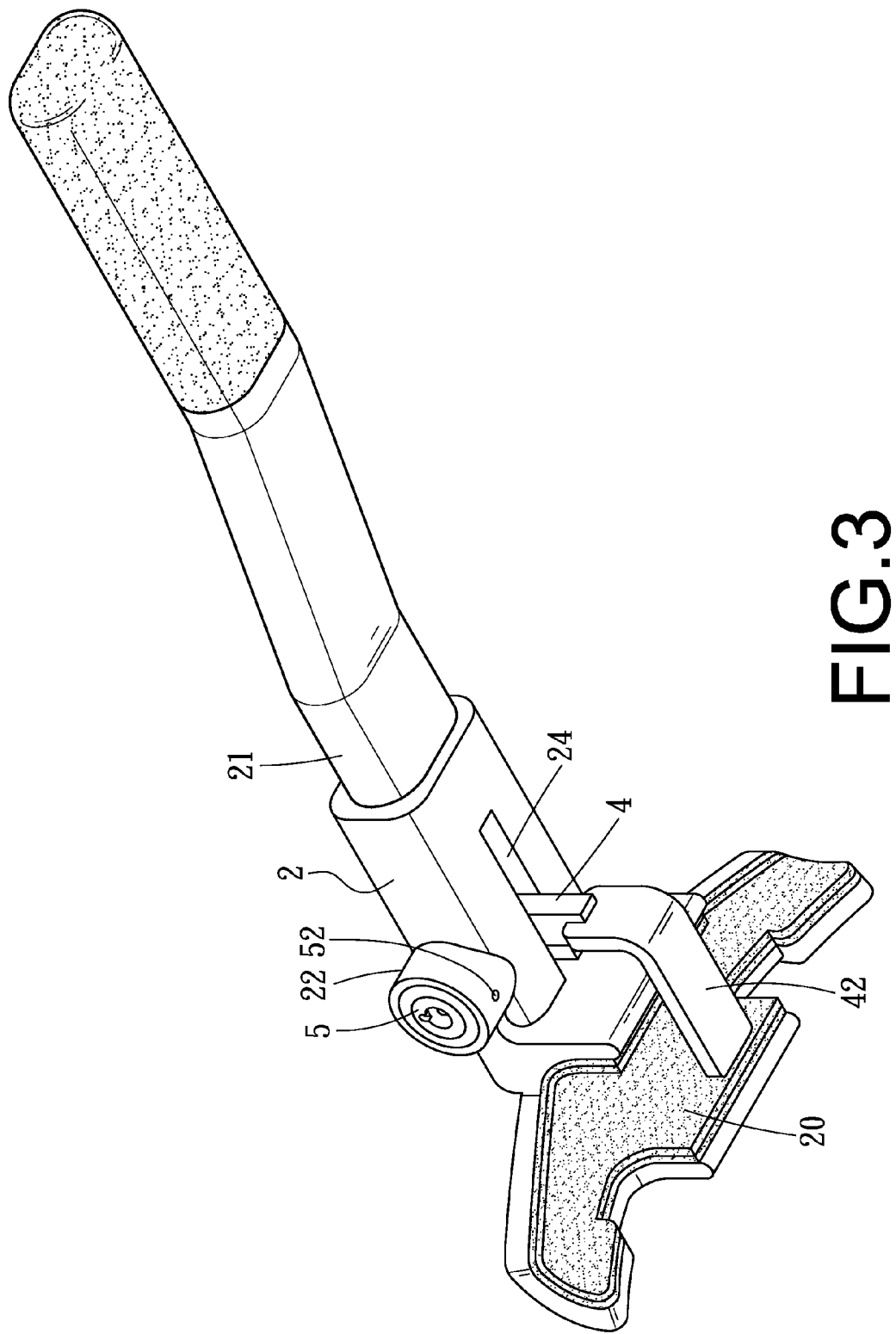
FIG. 3 is a perspective view of the automobile steering wheel lock in the present invention.
Figure 4:
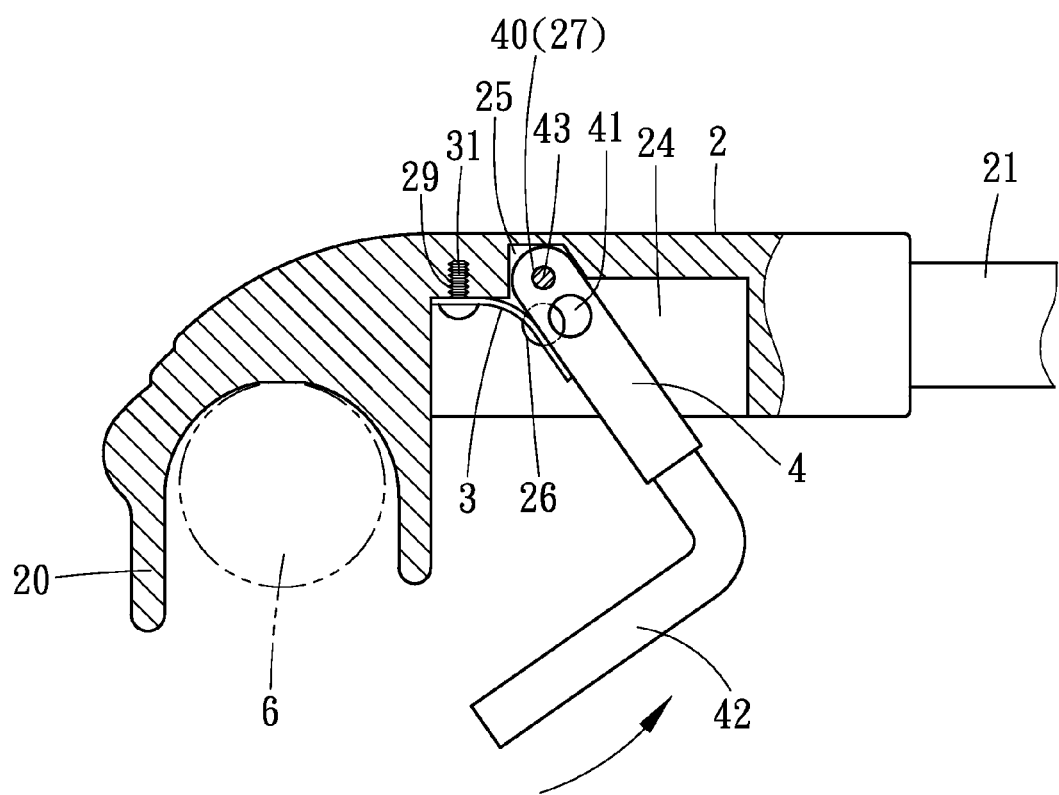
FIG. 4 is a cross-sectional view of the automobile steering wheel lock in the present invention in an unlocked condition.

In assembling, referring to FIGS. 2, 3 and 4, firstly, insert the locking member 31 through the insert hole 30 of the elastic plate 3 and screw it in the threaded hole 29 of the accommodating chamber 24 of the base 2 so as to fix one end of the elastic plate 3 in the accommodating chamber 24. Secondly, place an upper end of the position-limiting rod 4 in the recess 25 of the base 2, with the insert hole 40 of the position-limiting rod 4 aligned to the insert hole 27 of the lock core holder 22. Thirdly, insert the pivot 43 through the recessed chamber 23 of the lock core holder 22 into the insert holes 27 and 40 of the lock core holder 22 and of the position-limiting rod 4 so as to pivotally fix the upper end of the position-limiting rod 4 inside the base 2, with the other end of the elastic plate 3 elastically pushing against one side of the position-limiting rod 4. Finally, position the lock core 5 in the recessed chamber 23 of the lock core holder 22, with the lock pin 50 of the lock core 5 inserted in the lock pin hole 26 of the lock core holder 22 and with the pin hole 51 of the lock core 5 aligned to the pin hole 28 of the lock core holder 22, and then insert the fixing pin 52 in the pin holes 28 and 51 of the lock core holder 22 and of the lock core 5 so as to secure the lock core 5 in the lock core holder 22, thus finishing assembly of the automobile steering wheel lock.

Figure 5:
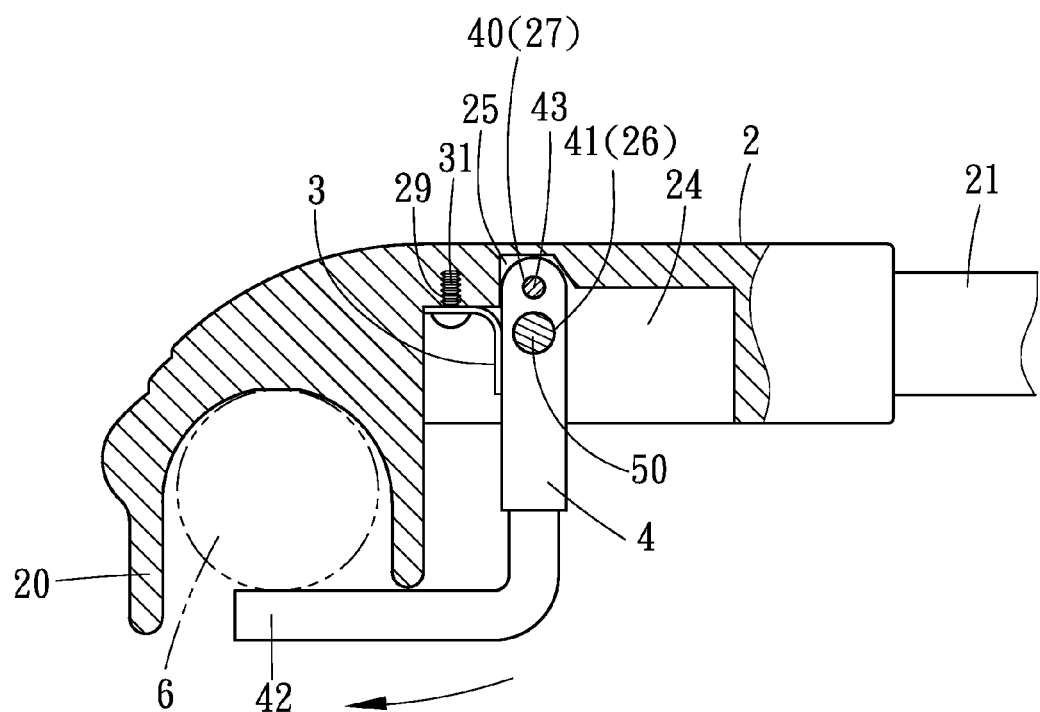
FIG. 5 is a cross-sectional view of the automobile steering wheel lock in the present invention in a locked condition.

To lock the steering wheel lock of the present invention on an automobile steering wheel 6, referring to FIGS. 4 and 5, firstly, clasp the clasping member 20 of the steering wheel lock on the automobile steering wheel 6, with the stationary rod 21 resting on an instrumental panel (not shown) of the automobile. Secondly, push the blocking plate 42 of the position-limiting rod 4 to rotate toward the clasping member 20 with the pivot 43 serving as a rotating center, by which the position-limiting rod 4 will press the elastic plate 3 to make it bent elastically. Thirdly, align the lock pin hole 41 of the position-limiting rod 4 to the lock pin 50 of the lock core 5. Finally, press the lock core 5 into the lock core holder 22 to make the lock pin 50 moved inwards and inserted in the lock pin hole 41 of the position-limiting rod 4 so as to restrict the position-limiting rod 4 in position, with the blocking plate 42 of the position-limiting rod 4 stopped at an underside of the clasping member 20 to hold the automobile steering wheel 6, thus finishing locking the steering wheel lock on the automobile steering wheel 6.

To unlock the steering wheel lock, as shown in FIG. 4, only insert a key into the lock core 5 and turn it around to actuate the lock pin 50 to move away from the lock pin hole 41 of the position-limiting rod 4 to make the position-limiting rod 4 no longer restricted by the lock pin 50, by which the elastic plate 3 will recover its elastic force to automatically push the position-limiting rod 4 to move backward to disengage the blocking plate 42 of the position-limiting rod 4 from the underside of the clasping member 20 and no longer hold the steering wheel 6. Thus the steering wheel lock can be removed from the automobile steering wheel 6, able to be locked and unlocked quickly and conveniently and having excellent effect in anti-burglary of automobiles.

As can be understood from the above description, this invention is much better than the conventional automobile steering wheel lock in effect of anti-burglary as well as in practicability.

While the preferred embodiment of the invention has been described above, it will be recognized and understood that various modifications may be made therein and the appended claims are intended to cover all such modifications that may fall within the spirit and scope of the invention.

What is claimed is:

1. An automobile steering wheel lock comprising:
   a base having a front end provided with a clasping member, a rear end provided with a stationary rod, one side provided with a lock core holder formed therein with a recessed chamber, and an underside provided with an accommodating chamber formed therein with a recess, said recessed chamber bored with a lock pin hole and an insert hole both passing through said accommodating chamber;
   an elastic plate assembled in said accommodating chamber of said base;
   a position-limiting rod assembled in said accommodating chamber of said base and provided with an insert hole, a lock pin hole, a blocking plate fixed at a lower end, and a pivot capable of being inserted in said insert holes of said lock core holder and of said position-limiting rod; and,
   a lock core received in said recessed chamber of said lock core holder and provided with a lock pin fixed thereon.

2. The automobile steering wheel lock as claimed in claim 1, wherein said lock core holder is bored with a pin hole communicating with said recessed chamber, and said lock core is provided with a pin hole in its outer wall and a fixing pin inserted in said pin holes of said lock core holder and of said lock core.

3. The automobile steering wheel lock as claimed in claim 1, wherein said accommodating chamber of said base is bored with a threaded hole, and said elastic plate is provided with an insert hole and a locking member capable of being inserted through said insert hole of said elastic plate and screwed in said threaded hole of said base.

\* \* \* \* \*